United States Patent
Chen et al.

(10) Patent No.: US 10,700,607 B2
(45) Date of Patent: Jun. 30, 2020

(54) CONTROL METHOD AND CONTROL CIRCUIT OF A MULTI-PHASE CONVERTER

(71) Applicant: Silergy Semiconductor Technology (Hangzhou) LTD, Hangzhou, ZheJiang Province (CN)

(72) Inventors: Chienchun Chen, Hangzhou (CN); Liwei Yen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 189 days.

(21) Appl. No.: 15/985,867

(22) Filed: May 22, 2018

(65) Prior Publication Data

US 2018/0351458 A1 Dec. 6, 2018

(30) Foreign Application Priority Data

Jun. 1, 2017 (CN) .......................... 2017 1 0403543

(51) Int. Cl.
  *H02M 3/158* (2006.01)
  *G05F 1/10* (2006.01)
  *H02J 1/10* (2006.01)
  *H02M 1/00* (2006.01)

(52) U.S. Cl.
  CPC ............ *H02M 3/1584* (2013.01); *G05F 1/10* (2013.01); *H02J 1/102* (2013.01); *H02M 2001/0012* (2013.01); *H02M 2001/0025* (2013.01)

(58) Field of Classification Search
  CPC ............... H02M 3/1584; H02M 3/158; H02M 2001/0025

USPC ......................................... 323/271–289, 315
See application file for complete search history.

(56) References Cited

U.S. PATENT DOCUMENTS

| | | | | |
|---|---|---|---|---|
| 6,137,274 A | * | 10/2000 | Rajagopalan | H02J 1/102 323/272 |
| 6,278,263 B1 | | 8/2001 | Walters | |
| 7,109,691 B2 | * | 9/2006 | Brooks | H02M 3/1584 323/272 |
| 7,477,045 B2 | * | 1/2009 | Schuellein | H02M 3/1584 323/225 |

(Continued)

FOREIGN PATENT DOCUMENTS

CN 104009618 A 8/2014

*Primary Examiner* — Jue Zhang
*Assistant Examiner* — Nusrat Quddus
(74) *Attorney, Agent, or Firm* — Michael C. Stephens, Jr.

(57) ABSTRACT

A control circuit of a multi-phase converter can include: an inductor current sampling circuit configured to generate a plurality of sampling signals corresponding to a plurality of channels of the multi-phase converter, where each of the sampling signals characterizes an inductor current of a corresponding channel; an error circuit configured to generate a plurality of error signals corresponding to the plurality of channels, where each of the error signals characterizes an error between the inductor current of the corresponding channel and a reference current; and a modified circuit configured to modify the sampling signals of the corresponding channels according to the plurality of error signals to generate a plurality of modified sampling signals, where the control circuit balances the inductor currents between the plurality of channels according to the plurality of modified sampling signals.

11 Claims, 6 Drawing Sheets

(56) References Cited

U.S. PATENT DOCUMENTS

| | | | |
|---|---|---|---|
| 7,479,772 B2* | 1/2009 | Zane | H02J 1/102 |
| | | | 323/272 |
| 9,081,397 B2* | 7/2015 | Jiang | G05F 1/10 |
| 2008/0018321 A1* | 1/2008 | Clavette | H02M 3/157 |
| | | | 323/316 |
| 2013/0057239 A1* | 3/2013 | Kalje | H02M 3/1584 |
| | | | 323/271 |
| 2013/0293203 A1* | 11/2013 | Chen | H02M 1/084 |
| | | | 323/234 |
| 2015/0091535 A1* | 4/2015 | Fan | H02M 3/1584 |
| | | | 323/234 |

* cited by examiner

CONTROL METHOD AND CONTROL CIRCUIT OF A MULTI-PHASE CONVERTER

RELATED APPLICATIONS

This application claims the benefit of Chinese Patent Application No. 201710403543.1, filed on Jun. 1, 2017, which is incorporated herein by reference in its entirety.

FIELD OF THE INVENTION

The present invention generally relates to the field of power electronics, and more particularly to control methods, control circuits, and multi-phase converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In switching power supply technology, in order to reduce inductor sizes of a converter, a multi-phase parallel interleaving may be adopted. Each channel of this multi-phase converter may have corresponding power switches and inductors. Input terminals of all the channels of the multi-phase converter can be connected in common to receive an input voltage, and output terminals can be connected in common to an input terminal of an output filter circuit of the multi-phase converter to output the output voltage through the output filter circuit. With such a multi-phase converter structure, a current that an inductor in a single-phase converter needs to withstand can be distributed equitably to the inductors of each channel of the multi-phase converter, and the current that each of the channels needs to withstand can be decreased greatly, such that inductor sizes of the converter can be reduced.

However, in such a multi-phase converter, the inductors of each channel can be mismatched, such as by an error between an actual value and an ideal value of the inductors of each channel, which can affect balancing of inductor currents of each channel. The larger the inductor is, the greater the current it can withstand. Thus, in order to balance (i.e., inductor currents in each channel are as equal as possible) the inductor currents of each channel, it may be necessary to perform current balance control of the currents between each of the channels when controlling operation of the multi-phase converter.

In one embodiment, a control circuit of a multi-phase converter, can include: (i) an inductor current sampling circuit configured to generate a plurality of sampling signals corresponding to a plurality of channels of the multi-phase converter, where each of the sampling signals characterizes an inductor current of a corresponding channel; (ii) an error circuit configured to generate a plurality of error signals corresponding to the plurality of channels, where each of the error signals characterizes an error between the inductor current of the corresponding channel and a reference current; and (iii) a modified circuit configured to modify the sampling signals of the corresponding channels according to the plurality of error signals to generate a plurality of modified sampling signals, where the control circuit balances the inductor currents between the plurality of channels according to the plurality of modified sampling signals.

Figure 1:
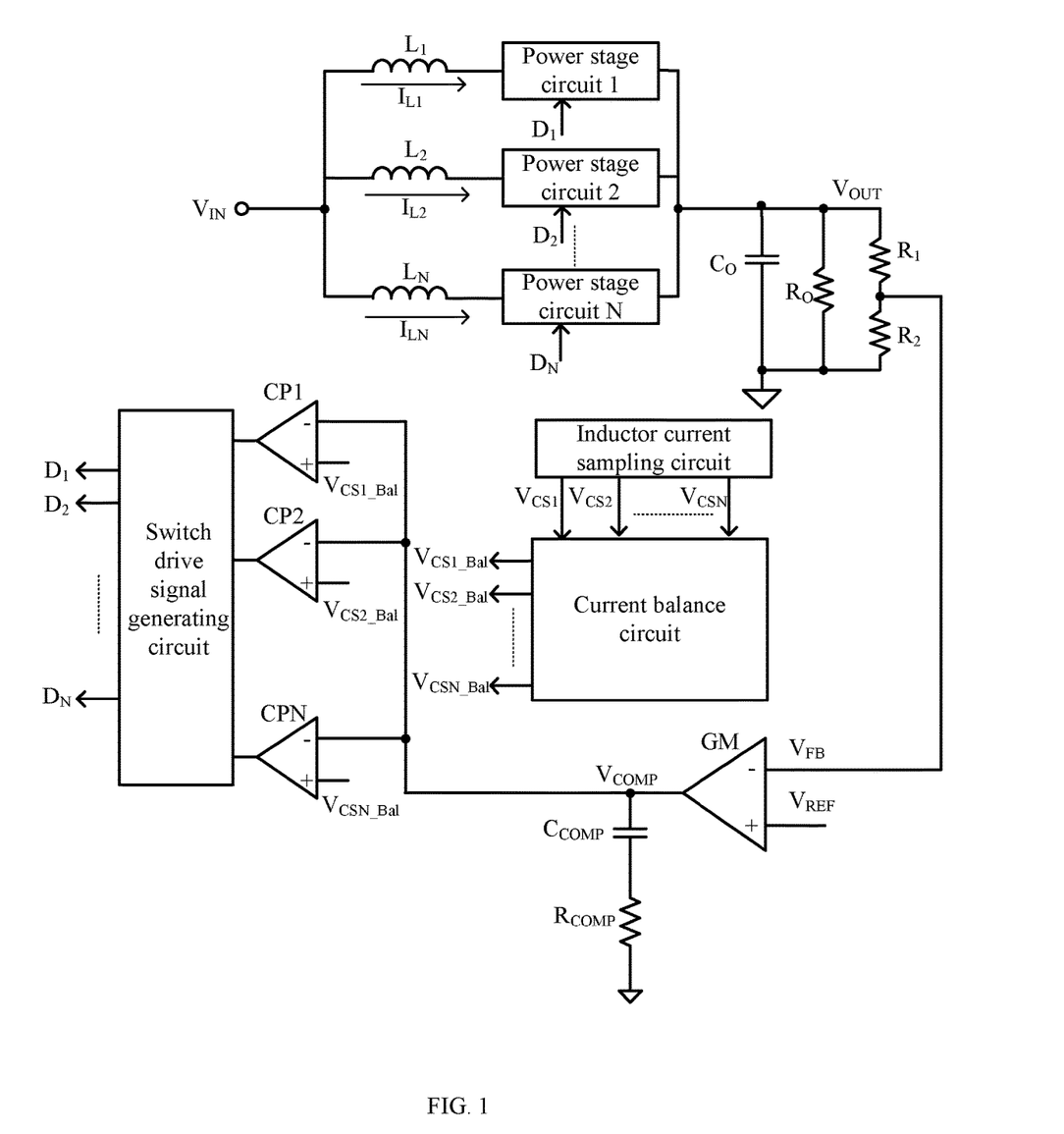
FIG. 1 is a schematic block diagram of an example multi-phase converter, in accordance with embodiments of the present invention.

Referring now to FIG. 1, shown is a schematic block diagram of an example multi-phase converter, in accordance with embodiments of the present invention. This example multi-phase converter can include a multi-phase power stage circuit and a control circuit. Input terminals of each phase power stage circuit (e.g., power stage circuits 1, 2, . . . N) can connect in common to receive input voltage $V_{IN}$, and output terminals of each phase power stage circuits can connect in common to provide output voltage $V_{OUT}$ through an output filter circuit that includes capacitor $C_O$ and resistor $R_O$. For ease of description, inductors in each phase power stage circuit (e.g., inductors $L_1, L_2, \ldots L_N$) are shown as separated from the corresponding power stage circuit, and each phase power stage circuit may be referred to as a channel of the multi-phase converter herein. For example, inductor $L_1$ and its associated power stage circuit 1 may form a channel of the multi-phase converter. In addition, any suitable topology (e.g., a boost type, a buck type, etc.) of each phase power stage circuit can supported in particular embodiments.

In this particular example, the control circuit of the multi-phase converter can include an inductor current sampling circuit, a current balance circuit, an error compensation circuit, a comparison circuit, and a switch drive signal generating circuit. The inductor current sampling circuit can generate sampling signals $V_{CS1}$, $V_{CS2}$, ... $V_{CSN}$ that correspond to the channels of the multi-phase converter. Each of the sampling signals can characterize an inductor current of a corresponding channel. For example, sampling signal $V_{CS1}$ is the sampling signal of inductor current $I_{L1}$ flowing through inductor $L_1$, sampling signal $V_{CS2}$ is the sampling signal of inductor current $I_{L2}$ flowing through inductor $L_2$, and sampling signal $V_{CSN}$ is the sampling signal of inductor current $I_{LN}$ flowing through inductor $L_N$. The inductor current sampling circuit can be directly connected to each inductor, in order to sample each inductor current, and to obtain each of the sampling signals by sampling the currents flowing through power switches of each channel.

Figure 2:
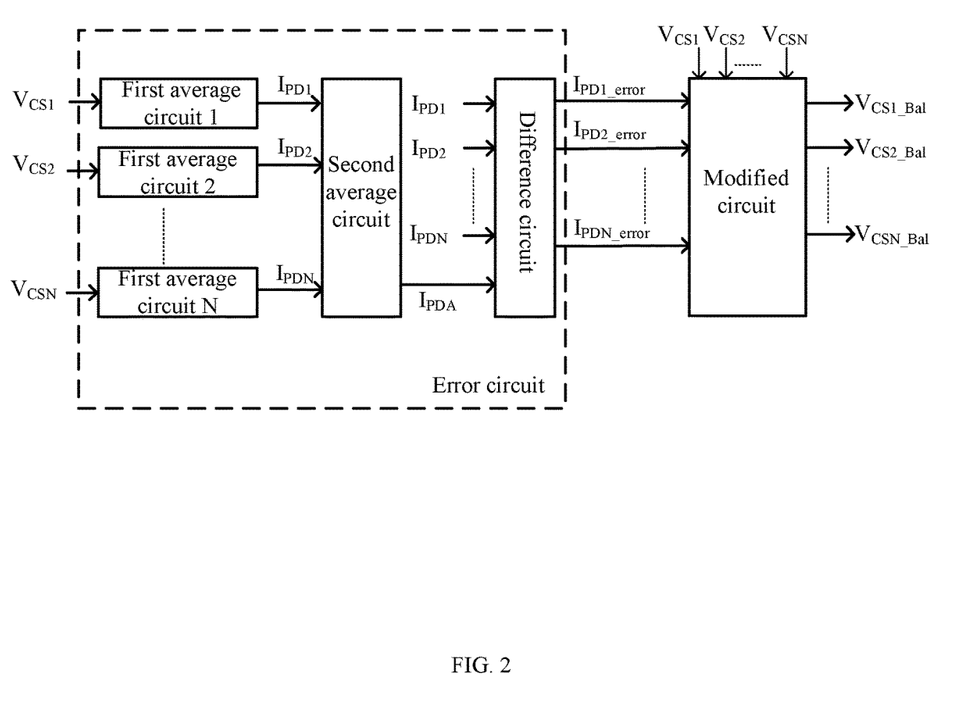
FIG. 2 is a schematic block diagram of an example current balance circuit of the circuit of FIG. 1, in accordance with embodiments of the present invention.

Referring now to FIG. 2, shown is a schematic block diagram of an example current balance circuit of the circuit of FIG. 1, in accordance with embodiments of the present invention. The error circuit can generate error signals that correspond to the channels, such as $I_{PD1\_error}$, $I_{PD2\_error}$, ... $I_{PDN\_error}$, and each error signal can characterize an error between the inductor current of the corresponding channel and a reference current. The error circuit can generate the error signals that correspond to each of the sampling signals according to sampling signals $V_{CS1}$, $V_{CS2}$, ... and $V_{CSN}$, where the reference current can be a predetermined value, and may also be an average between the inductor currents of the corresponding channels.

As shown in FIG. 2, the error circuit further can include "first" average circuits (e.g., average circuits 1, 2, ... N). Each of the first average circuits can generate average signals $I_{PD1}$, $I_{PD2}$, ... and $I_{PDN}$ that correspond to the channels of the multi-phase converter, and each of the first average signals can characterize an average of the inductor current of the corresponding channel. For example, average signal $I_{PD1}$ can characterize the average of inductor current $I_{L1}$, average signal $I_{PD2}$ can characterize the average of inductor current $I_{L2}$, and average signal $I_{PDN}$ can characterize the average of inductor current $I_{LN}$. Each of the first average circuits can generate the corresponding first average signal according to the sampling signal of the corresponding channel.

Figure 3:
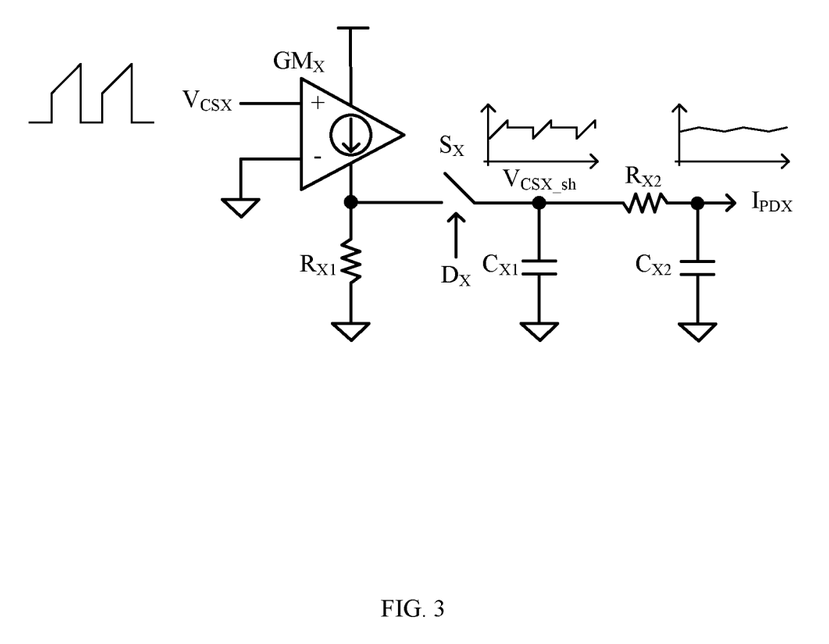
FIG. 3 is a schematic block diagram of an example first average circuit of the circuit of FIG. 2, in accordance with embodiments of the present invention.

Referring now to FIG. 3, shown is a schematic block diagram of an example first average circuit of the circuit of FIG. 2, in accordance with embodiments of the present invention. This example may correspond to an Xth channel of the multi-phase converter, and the X can be greater than or equal to 1, and less than or equal to the N. The first average circuit X can receive sampling signal $V_{CSX}$, and may generate average signal $I_{PDX}$ that is equal to the average of sampling signal $V_{CSX}$. Due to sampling signal $V_{CSX}$ characterizing the inductor current of the Xth channel, average signal $I_{PDX}$ can also characterize the average of the inductor current of the channel, and average signal $I_{PDX}$ can be equal to the average of the inductor current of the Xth channel, or may be in proportion to the average. Average circuit X can include transconductance amplifier $GM_X$, resistor $R_{X1}$, switch $S_X$, capacitor $C_{X1}$, resistor $R_{X2}$, and capacitor $C_{X2}$. For example, a non-inverting terminal of transconductance amplifier $GM_X$ can receive sampling signal $V_{CSX}$ and an inverting terminal can connect to ground for reference, in order to convert sampling signal $V_{CSX}$ to a transconductance current to output.

The transconductance current may flow through resistor $R_{X1}$ to form a charging voltage that can charge capacitor $C_{X1}$ to form voltage $V_{CSX\_sh}$ on capacitor $C_{X1}$ during the conduction of switch $S_X$. Voltage $V_{CSX\_sh}$ may be filtered by a filter circuit that includes resistor $R_{X2}$ and capacitor $C_{X2}$, and may then form average signal $I_{PDX}$. The switching state of switch $S_X$ can be the same as the switching state of the power switch of the Xth channel; that is, switch $S_X$ can be controlled by switch drive signal $D_X$ of the power switch of the Xth channel. For example, product of the transconductance of transconductance amplifier $GM_X$ and resistor $R_{X1}$ is 1, and the transconductance of transconductance amplifier $GM_X$ is 50 µS and resistor $R_{X1}$ is 10 kΩ.

In FIG. 2, the error circuit can further include a difference circuit, which can generate error signals $I_{PD1\_error}$, $I_{PD2\_error}$, ... $I_{PDN\_error}$ according to the respective difference between average signals $I_{PD1}$, $I_{PD2}$, ... $I_{PDN}$ and a reference characterization signal of the reference current. For example, the reference characterization signal can be equal to the reference current, or in proportion to the reference current, in order to characterize the reference current. In this example, the reference characterization signal can be an average of average signals $I_{PD1}$, $I_{PD2}$, ... and $I_{PDN}$; that is, the reference characterization signal can characterize an average current of the inductor currents between each of the channels.

In the example of FIG. 2, the error circuit can also include a "second" average circuit that can receive each of average signals $I_{PD1}$, $I_{PD2}$, ... and $I_{PDN}$, and may generate average signal $I_{PDA}$ that characterizes the average of each of average signals $I_{PD1}$, $I_{PD2}$, ... and $I_{PDN}$, where $I_{PDA}$ equals to $(I_{PD1}+I_{PD2}+ ... +I_{PDN})/N$. Also, average signal $I_{PDA}$ can be set as the reference characterization signal. Each of the error signals may be equal to the difference between the corresponding first and second average signals. As such, the error signal relations can satisfy the following equations (1).

$$I_{PD1\_error} = I_{PD1} - I_{PDA};$$
$$I_{PD2\_error} = I_{PD2} - I_{PDA};$$
$$...$$
$$I_{PDN\_error} = I_{PDN} - I_{PDA}. \quad (1)$$

Figure 4:
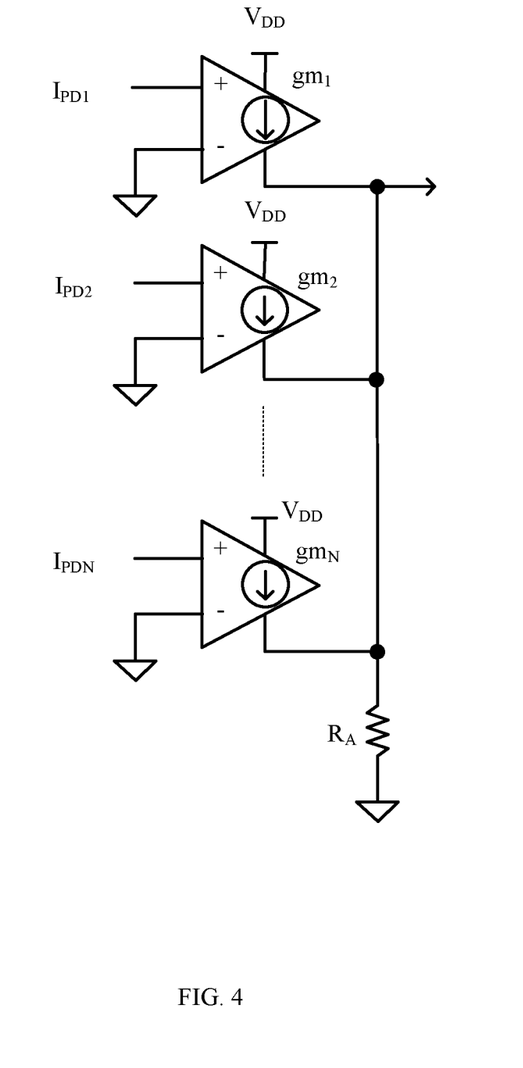
FIG. 4 is a schematic block diagram of an example second average circuit of the circuit of FIG. 2, in accordance with embodiments of the present invention.

Referring now to FIG. 4, shown is a schematic block diagram of an example second average circuit of the circuit of FIG. 2, in accordance with embodiments of the present invention. This particular example second average circuit can include transconductance amplifiers $gm_1$, $gm_2$, ... $gm_N$, and resistor $R_A$. The non-inverting input terminals of transconductance amplifiers $gm_1$, $gm_2$, ... $gm_N$ can respectively receive average signals $I_{PD1}$, $I_{PD2}$, ... $I_{PDN}$. The inverting input terminals of the transconductance amplifiers may all be connected to the ground, and the output terminals may all be connected to a first terminal of resistor $R_A$ in order to output average signal $I_{PDA}$. A second terminal of resistor $R_A$ can connect to ground, where the product of the sum of the transconductances that correspond to transconductance amplifiers $gm_1$, $gm_2$, ... $gm_N$ and resistor $R_A$ may be 1.

Figure 5:
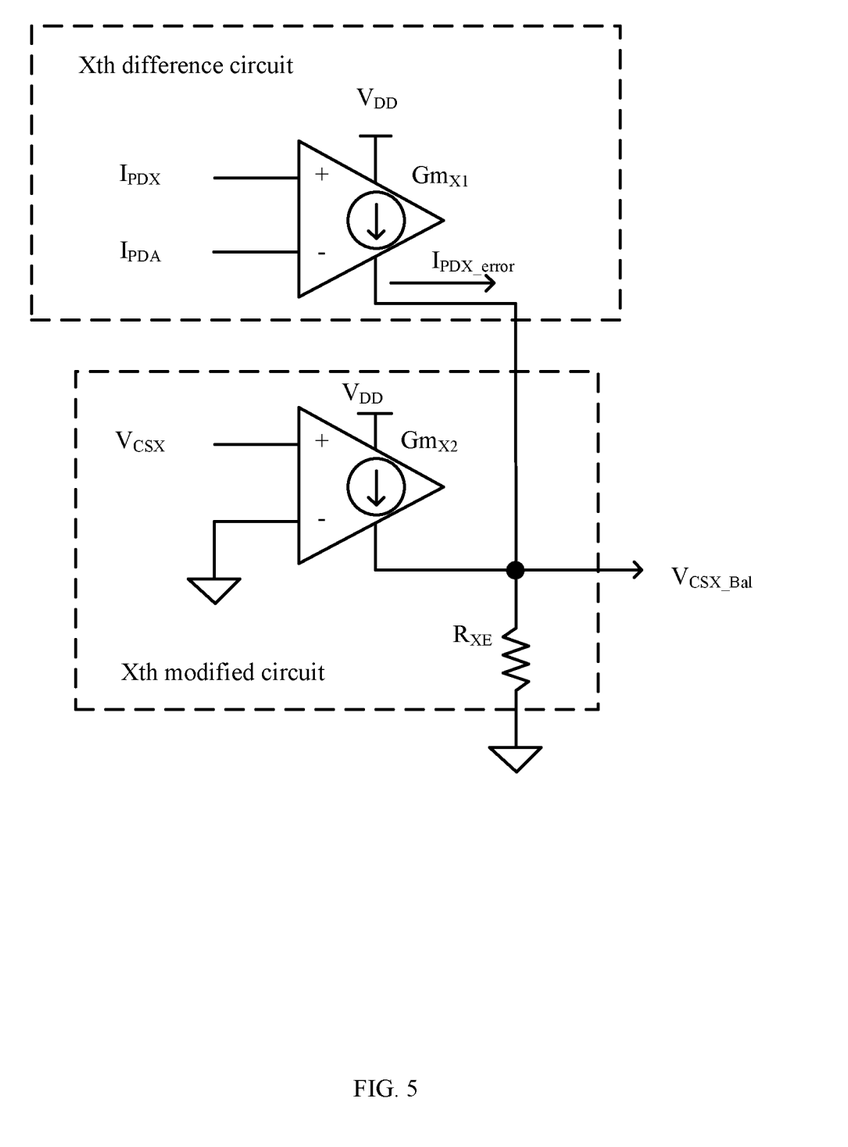
FIG. 5 is a schematic block diagram of example Xth difference and Xth modified circuits corresponding to an Xth channel of the example multi-phase converter, in accordance with embodiments of the present invention.

The modified circuit can modify sampling signals $V_{CS1}$, $V_{CS2}$, ... $V_{CSN}$ of the corresponding channels according to error signals $I_{PD1\_error}$, $I_{PD2\_error}$, ... $I_{PDN\_error}$, in order to generate modified sampling signals $V_{CS1\_Bal}$, $V_{CS2\_Bal}$, ... $V_{CSN\_Bal}$. In this way, the control circuit can balance the inductor currents between the channels according to the modified sampling signals. Each of the modified sampling signals can be a superimposed signal of the corresponding sampling signal and the error signal. That is, each of the modified sampling signals may be equal to the sum of the corresponding sampling signal and the error signal. For example, $V_{CS1\_Bal}$ can be equal to the sum of $V_{CS1}$ and $I_{PD1\_error}$, $V_{CS2\_Bal}$ equal to the sum of $V_{CS2}$ and $I_{PD2\_error}$, and $V_{CSN\_Bal}$ equal to the sum of $V_{CSN}$ and $I_{PDN\_error}$. In this example, the difference circuit can include a plurality of difference circuits corresponding to each of the channels of the multi-phase converter, the modified circuit can also include a plurality of modified circuits corresponding to each of the channels of the multi-phase converter, and each difference circuit is corresponding to each modified circuit. FIG. 5 shows a specific circuit diagram of an Xth difference circuit and an Xth modified circuit corresponding to the Xth channel of the multi-phase converter.

Referring now to FIG. 5, shown is a schematic block diagram of example Xth difference and Xth modified circuits corresponding to an Xth channel of the example multi-phase converter, in accordance with embodiments of the present invention. In this example, the Xth difference circuit can include transconductance amplifier $Gm_{X1}$ with its non-inverting input terminal receiving average signal $I_{PDX}$, its inverting input terminal receiving average signal $I_{PDA}$, and its output terminal providing error signal $I_{PDX\_error}$. The Xth modified circuit can include transconductance amplifier $Gm_{X2}$ and resistor $R_{XE}$. A non-inverting input terminal of the transconductance amplifier can receive sampling signal $V_{CSX}$, the inverting input terminal can connect to ground, and an output terminal can connect to a first terminal of resistor $R_{XE}$, while a second terminal of resistor $R_{XE}$ is connected to ground.

An output of transconductance amplifier $Gm_{X1}$ can connect to the first terminal of resistor $R_{XE}$, such that transconductance amplifiers $Gm_{X1}$ and $Gm_{X2}$ all output respective transconductance current to resistor $R_{XE}$, in order to form modified sampling signal $V_{CSX\_Bal}$ through resistor $R_{XE}$. By setting the transconductances of $Gm_{X1}$ and $Gm_{X2}$ and resistor $R_{XE}$ accordingly, $V_{CSX\_Bal}$ can be equal to the sum of $V_{CSX}$ and $I_{PDX\_error}$. For example, the product of the transconductance of $Gm_{X1}$ and resistor $R_{XE}$ may be set to be 1, and the product of the transconductance of $Gm_{X2}$ and resistor $R_{XE}$ may also be set to be 1.

Referring also to FIG. 1, the error compensation circuit can generate error compensation signal $V_{COMP}$ that characterizes a difference between output feedback signal $V_{FB}$ of the multi-phase converter and an output reference signal $V_{REF}$. The error compensation circuit can include a transconductance amplifier GM, a compensation circuit, and an output feedback circuit. A non-inverting input terminal of transconductance amplifier GM can receive output reference signal $V_{REF}$, an inverting input terminal can receive feedback signal $V_{FB}$, and an output terminal connected to the compensation circuit can output error compensation signal $V_{COMP}$. The compensation circuit can include capacitor $C_{COMP}$ and resistor $R_{COMP}$ connected in series between the output terminal of transconductance GM and ground. The output feedback circuit can generate output feedback signal $V_{FB}$, which can be a resistor divider network connected to the output terminal and the resistor divider network, and may include resistors $R_1$ and $R_2$.

In the FIG. 1, the compensation circuit can compare error compensation signal $V_{COMP}$ against each of modified sampling signals $V_{CS1\_Bal}$, $V_{CS2\_Bal}$, ... $V_{CSN\_Bal}$ to output comparison signals. The switch drive signal generating circuit may generate switch drive signals $D_1, D_2, \ldots D_N$ according to each of the comparison signals, in order to control the switching state of the power switch of each channel, thereby balancing the inductor currents between each of the channels. For example, the comparison circuit further can include comparators corresponding to each channel of the multi-phase converter.

Each comparator can respectively compare the corresponding modified sampling signal against the error compensation signal. When the modified signal is equal to compensation signal $V_{COMP}$, the corresponding switch drive signal generated by the switch drive signal generating circuit can control the power switch of the corresponding channel to be turned off. For example, a non-inverting input terminal of comparator CP1 corresponding to the first channel can receive modified sampling signal $V_{CS1\_Bal}$, and an inverting input terminal can receive error compensation signal $V_{COMP}$. When $V_{CS1\_Bal}$ reaches the value of $V_{COMP}$, switch drive signal $D_1$ can transition to an inactive state in order to control the power switch of the first channel to be turned off.

A non-inverting input terminal of comparator CP2 that corresponds to the second channel can receive modified sampling signal $V_{CS2\_Bal}$, and an inverting input terminal can receive error compensation signal $V_{COMP}$. When $V_{CS2\_Bal}$ reaches the value of $V_{COMP}$, switch drive signal $D_2$ may transition to an inactive state to control the power switch of the second channel to be turned off. Also, a non-inverting input terminal of comparator CPN that corresponds to the Nth channel can receive modified sampling signal $V_{CSN\_Bal}$, and an inverting input terminal can receive error compensation signal $V_{COMP}$. When $V_{CSN\_Bal}$ reaches the value of $V_{COMP}$, switch drive signal $D_N$ may transition to an inactive state in order to control the power switch of the Nth channel to be turned off. Those skilled in the art will recognize that each power switch can be controlled to be turned on through clock signals, or other pulse-width modulation (PWM) control signals, etc., when the power switch is to be turned on.

Figure 6:
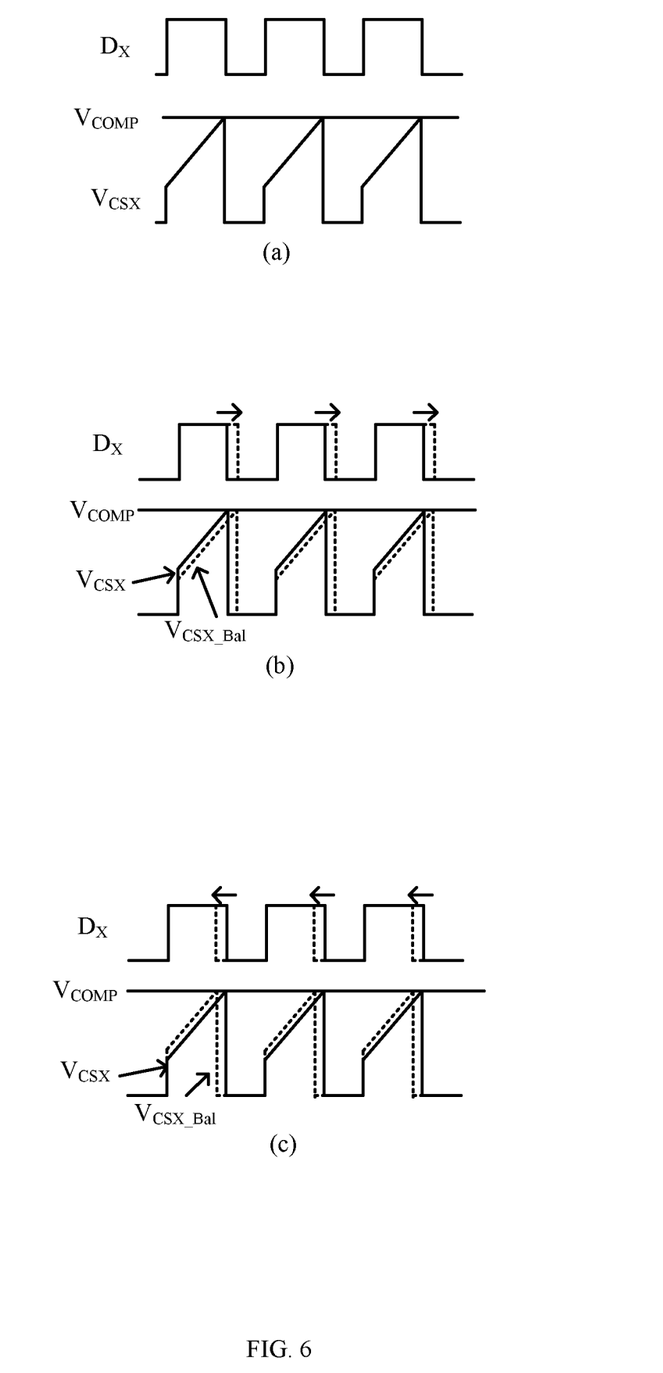
FIG. 6 is waveform diagrams of example control operation of the example multi-phase converter, in accordance with embodiments of the present invention.

Referring now to FIG. 6, shown is waveform diagrams of example control operation of the example multi-phase converter, in accordance with embodiments of the present invention. In FIG. 6, waveforms 6(a) show an example whereby sampling signal $V_{CSX}$ is not modified, and waveforms 6(b) and 6(c) show example current balance control according to modified sampling signal $V_{CSX\_Bal}$ after sampling signal $V_{CSX}$ is modified. In 6(b), when inductor current $I_{LX}$ of the channel is less than the reference current (e.g., average signal $I_{PDX}$ is less than average signal $I_{PDA}$), corresponding error signal $I_{PDX\_error}$ may be less than zero, making corresponding modified signal $V_{CSX\_Bal}$ decrease and become less than corresponding sampling signal $V_{CSX}$. Thus, the time required for modified signal $V_{CSX\_Bal}$ to reach error compensation signal $V_{COMP}$ may be extended and the duty ratio of switch drive signal DX can be increased to increase inductor current $I_{LX}$, thus approaching the reference current.

In waveforms 6(c) of FIG. 6, when inductor current $I_{LX}$ of the channel is higher than the reference current (e.g., average signal $I_{PDX}$ is greater than average signal $I_{PDA}$), corresponding error signal $I_{PDX\_error}$ may be greater than zero, making corresponding modified signal $V_{CSX\_Bal}$ increase and become greater than corresponding sampling signal $V_{CSX}$. Thus, the time required for modified signal $V_{CSX\_Bal}$ to reach error compensation signal $V_{COMP}$ may be reduced and the duty ratio of switch drive signal DX can be reduced to decrease the inductor current $I_{LX}$, thus approaching the reference current.

In particular embodiments, the error signal that can characterize the error between inductor currents of each channel of the multi-phase converter and the reference current, may be generated to modify the sampling signal of the inductor current of the corresponding channel, such that the corresponding modified sampling signal can be obtained. Also, the switch drive signal of the power switch of each channel may be generated according to the modified sampling signal. When the inductor current of a certain channel of the multi-phase converter is low, the corresponding modified sampling signal can be increased, thereby controlling the duty ratio of the corresponding switch drive signal to decrease, and subsequently adjusting the inductor current of the corresponding channel to decrease. When the inductor current of a certain channel of the multi-phase converter is high, the corresponding modified sampling signal can decrease, thereby controlling the duty ratio of the corresponding switch drive signal to increase, and subsequently adjusting the inductor current of the corresponding channel to increase, such that balance between the inductor currents of each channel is realized.

In particular embodiments, a method of controlling the multi-phase converter can include generating sampling signals corresponding to the plurality of channels of the multi-phase converter, where each sampling signal characterizes the inductor current of the corresponding channel. The method can also include generating the error signals corresponding to the channels, where each error signal characterizes the error between the inductor current of the corresponding channel and the reference current. The method can also include acquiring the modified sampling signals according to the sampling signals modified by the error signal, and balancing the inductor currents of the channels according to the modified sampling signals.

For example, generating the error signals can include generating the first average signals corresponding to the channels of the multi-phase converter, where each of the first average signals characterizes the average of the inductor current of the corresponding channel. Generating the error signals can also include generating the corresponding error signal according to a difference between the first average signal and the reference characterization signal of the reference current. The method can further include generating the second average signals characterizing the average of the first average signals, where the second average signal may be set as the reference characterization signal.

For example, balancing the inductor currents between the channels according to the modified sampling signal can include generating the error compensation signal that characterizes the difference between the output feedback signal and the output reference signal of the multi-phase converter. Balancing the inductor currents can also include generating the switch drive signals by comparing the error compensation signal against each of the modified sampling signals to control the switching state of the power switch of each of the channels, thereby balancing the inductor currents between each of the channels.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a multi-phase converter, the method comprising:
    a) generating a plurality of sampling signals corresponding to a plurality of channels of the multi-phase converter, wherein each sampling signal represents an inductor current of a corresponding channel;
    b) generating a plurality of error signals corresponding to the plurality of channels, wherein each of the error signals represents an error between the inductor current of the corresponding channel and a reference current;
    c) generating, by a modified circuit, a plurality of modified sampling signals according to the sampling signals regulated in accordance with the corresponding error signal, wherein each of the modified sampling signals comprises a sum of the corresponding sampling signal and the corresponding error signal; and
    d) balancing, by a control circuit, the inductor currents of the channels according to the plurality of modified sampling signals by generating an error compensation signal that represents a difference between an output feedback signal and an output reference signal of the multi-phase converter, and generating a plurality of switch drive signals by comparing the error compensation signal and each of the modified sampling signals to control a switching state of a power switch of each of the channels.

2. The method of claim 1, wherein the generating the plurality of error signals comprises:
    a) generating a plurality of first average signals corresponding to the plurality of channels of the multi-phase converter, wherein each of the plurality of first average signals represents an average of the inductor current of the corresponding channel; and
    b) generating the corresponding error signal according to a difference between the first average signal and a reference characterization signal of the reference current.

3. The method of claim 2, further comprising generating a second average signal representing an average of the plurality of first average signals, wherein the second average signal is set as the reference characterization signal.

4. A control circuit of a multi-phase converter, the control circuit comprising:
    a) an inductor current sampling circuit configured to generate a plurality of sampling signals corresponding to a plurality of channels of the multi-phase converter, wherein each of the sampling signals represents an inductor current of a corresponding channel;
    b) an error circuit configured to generate a plurality of error signals corresponding to the plurality of channels, wherein each of the error signals represents an error between the inductor current of the corresponding channel and a reference current; and
    c) a modified circuit configured to regulate the sampling signals of the corresponding channels according to the plurality of error signals to generate a plurality of modified sampling signals, wherein the control circuit balances the inductor currents between the plurality of channels according to the plurality of modified sampling signals, and wherein each of the modified sampling signals comprises a sum of the corresponding sampling signal and the corresponding error signal.

5. The control circuit of claim 4, wherein the error circuit comprises:
    a) a first average circuit configured to generate a plurality of first average signals representing the plurality of channels of the multi-phase converter, wherein each of the plurality of first average signals represents an average of the inductor current of the corresponding channel; and
    b) a difference circuit configured to generate the corresponding error signal according to a difference between the first average signal and a reference characterization signal of the reference current.

6. The control circuit of claim 4, wherein the error circuit further comprises a second average circuit configured to generate a second average signal representing an average of a plurality of first average signals that is configured as the reference characterization signal.

7. The control circuit of claim 4, wherein the modified sampling signal is increased when the error signal is greater than zero, and the modified sampling signal is decreased when the error signal is less than zero.

8. The control circuit of claim 4, further comprising:
   a) an error compensation circuit configured to generate an error compensation signal representing an output feedback signal and an output reference signal of the multi-phase converter;
   b) a comparison circuit configured to compare the error compensation signal and each of the modified sampling signals to output a plurality of comparison signals; and
   c) a switch drive signal generating circuit configured to generate a plurality of switch drive signals according to each of the comparison signals to control a switching state of a power switch of each of the channels, thereby balancing the inductor currents between each of the channels.

9. A control circuit of a multi-phase converter, the control circuit comprising:
   a) an inductor current sampling circuit configured to generate a plurality of sampling signals corresponding to a plurality of channels of the multi-phase converter, wherein each of the sampling signals represents an inductor current of a corresponding channel;
   b) an error circuit configured to generate a plurality of error signals corresponding to the plurality of channels, wherein each of the error signals represents an error between the inductor current of the corresponding channel and a reference current;
   c) a modified circuit configured to regulate the sampling signals of the corresponding channels according to the plurality of error signals to generate a plurality of modified sampling signals, wherein the control circuit balances the inductor currents between the plurality of channels according to the plurality of modified sampling signals, and wherein each of the modified sampling signals comprises a sum of the corresponding sampling signal and the corresponding error signal;
   d) an error compensation circuit configured to generate an error compensation signal representing an output feedback signal and an output reference signal of the multi-phase converter;
   e) a comparison circuit configured to compare the error compensation signal and each of the modified sampling signals to output a plurality of comparison signals; and
   f) a switch drive signal generating circuit configured to generate a plurality of switch drive signals according to each of the comparison signals to control a switching state of a power switch of each of the channels, thereby balancing the inductor currents between each of the channels.

10. The control circuit of claim 9, wherein the error circuit comprises:
    a) a first average circuit configured to generate a plurality of first average signals representing the plurality of channels of the multi-phase converter, wherein each of the plurality of first signals represents an average of the inductor current of the corresponding channel; and
    b) a difference circuit configured to generate the corresponding error signal according to a difference between the first average signal and a reference characterization signal of the reference current.

11. The control circuit of claim 9, wherein the error circuit further comprises a second average circuit configured to generate a second average signal representing an average of a plurality of first average signals, so as to be set as a reference characterization signal.

\* \* \* \* \*